United States Patent
Barnabo et al.

(10) Patent No.: US 7,439,735 B2
(45) Date of Patent: Oct. 21, 2008

(54) RAIL ACTIVATED POSITION SENSOR

(75) Inventors: Susan M. Barnabo, Walpole, MA (US); Mark Freeman, Framingham, MA (US); Kayvan Hedayat, Weston, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/753,093

(22) Filed: Jan. 7, 2004

(65) Prior Publication Data

US 2005/0062467 A1   Mar. 24, 2005

Related U.S. Application Data

(63) Continuation-in-part of application No. 10/675,199, filed on Sep. 29, 2003.

(60) Provisional application No. 60/438,399, filed on Jan. 7, 2003.

(51) Int. Cl.
*G01B 7/14* (2006.01)
(52) U.S. Cl. .............................. 324/207.26; 324/207.2
(58) Field of Classification Search ............. 324/207.2, 324/207.13, 207.21, 207.22, 207.24, 207.26; 280/735; 296/65.12, 65.15
See application file for complete search history.

(56) References Cited

U.S. PATENT DOCUMENTS

| | | | | |
|---|---|---|---|---|
| 4,236,093 A | * | 11/1980 | Birnbaum | 310/155 |
| 4,667,514 A | | 5/1987 | Baer | 73/386 |
| 5,781,005 A | * | 7/1998 | Vig et al. | 324/207.2 |
| 6,095,555 A | * | 8/2000 | Becker et al. | 280/735 |
| 6,140,727 A | * | 10/2000 | Goto et al. | 310/155 |
| 6,351,994 B1 | | 3/2002 | Pinkos et al. | 73/432.1 |
| 6,573,623 B2 | | 6/2003 | Tsuboi et al. | 310/12 |
| 6,593,735 B2 | | 7/2003 | Becker | 324/207.26 |
| 6,683,544 B2 | * | 1/2004 | Tokunaga et al. | 341/15 |
| 2002/0125396 A1 | * | 9/2002 | Kume et al. | 248/429 |
| 2002/0190874 A1 | * | 12/2002 | Tokunaga et al. | 341/15 |
| 2003/0060997 A1 | | 3/2003 | Ilyes | 702/127 |

* cited by examiner

*Primary Examiner*—Patrick Assouad
*Assistant Examiner*—David M. Schindler
(74) *Attorney, Agent, or Firm*—Grossman Tucker Perreault & Pfleger, PLLC

(57) ABSTRACT

A position sensor including a sensor assembly adapted to mount to a first rail of an automotive seat rail assembly. The sensor assembly includes a Hall device and a magnet. The assembly is mountable to the first rail to cause a first output of the Hall device when the first rail is in a first position relative to a second rail of the automotive seat rail assembly, and to cause a second output of the Hall device when the first rail is in a second position relative to the second rail.

13 Claims, 20 Drawing Sheets

RAIL ACTIVATED POSITION SENSOR

CROSS-REFERENCE TO RELATED APPLICATIONS

This application is a continuation-in-part of U.S. application Ser. No. 10/675,199, filed Sep. 29, 2003, and claims the benefit of U.S. provisional application Ser. No. 60/438,399, filed Jan. 7, 2003, the entire disclosures of which applications are incorporated herein by reference.

FIELD OF THE INVENTION

The present invention relates in general to position sensors, and, more particularly, to a non-contact position sensor for sensing the position of a movable item such as an automobile seat.

BACKGROUND OF THE INVENTION

In a wide variety of applications it is advantageous or necessary to sense the position of a linearly or rotationally movable element. For example, in automobile seat applications the seat may be linearly movable, either manually or automatically via electromechanical means, on an associated track assembly. A sensor may provide a signal representative of the linear position of the seat on the track for a variety of purposes, e.g. to control deployment of an air bag, to control the electromechanical actuator that causes translation of the seat in connection with a seat position memory feature, etc.

For a seat position application, it is increasingly desirable for a sensor to provide multiple position outputs for purposes of ascertaining occupant position. For example, in applications where seat position is used to control air bag deployment early configurations involved only single stage air bag systems. A single stage air bag deploys with a known deployment force that may not be varied. In this application, seat position information was used only to determine when the airbag should be deployed. However, the advent of dual stage air bags, i.e. air bags that may be deployed with two distinct deployment forces, required increased resolution in position sensing. Also, the industry is now moving to variable stage airbags where the deployment force may be varied depending upon occupant position and classification. Variable stage airbag configurations will require a sensor that can detect multiple seat positions for use in determining the appropriate deployment force.

Another desirable feature of a position sensor, especially in the context of an automobile seat application, is that it be non-contact. A non-contact sensor has a sensing element that does not physically contact the sensed object. It is also advantageous that the sensor be mechanically decoupled from the seat track in an automobile seat application. These features allow quiet operation of the sensor and minimize wear, which could cause deterioration of performance.

Another difficulty associated with seat position sensors is that the seat track environment is very crowded, e.g., there is limited physical space for such sensors. Also the space available for the sensor may vary from among vehicle types. The size and packaging of the sensor should, therefore, be flexible to allow use in a variety of vehicle types. In addition, it would be advantageous to have a menu of sensor configurations to allow selective use of an appropriate configuration depending on the track environment.

Accordingly, there is a need for a non-contact position sensor that provides accurate and reliable position sensing that may be cost-effectively produced and installed.

SUMMARY OF THE INVENTION

According to one aspect of the invention, a position sensor consistent with the present invention includes a sensor assembly adapted to mount to a first rail of an automotive seat rail assembly. The sensor assembly includes a Hall device and a magnet. The assembly is mountable to the first rail to cause a first output of the Hall device when the first rail is in a first position relative to a second rail of the automotive seat rail assembly, and to cause a second output of the Hall device when the first rail is in a second position relative to the second rail.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION

For ease of explanation, sensor systems consistent with the invention will be described herein in connection with an automobile seat position sensing application. It will be recognized, however, that sensor systems consistent with the invention will be useful in other applications. In addition, the exemplary embodiments described herein include use of Hall Effect sensors and a magnet. Those skilled in the art will recognize, however, that a variety of sensing means may be used. For example, optical, magneto-resistive, fluxgate sensors, etc. may be useful in connection with a sensor system consistent with the invention. In alternative embodiments sensor control elements other than magnets or shunts, e.g. an optical source, may be used. It is to be understood, therefore, that illustrated exemplary embodiments described herein are provided only by way of illustration, and are not intended to be limiting.

Figure 1:
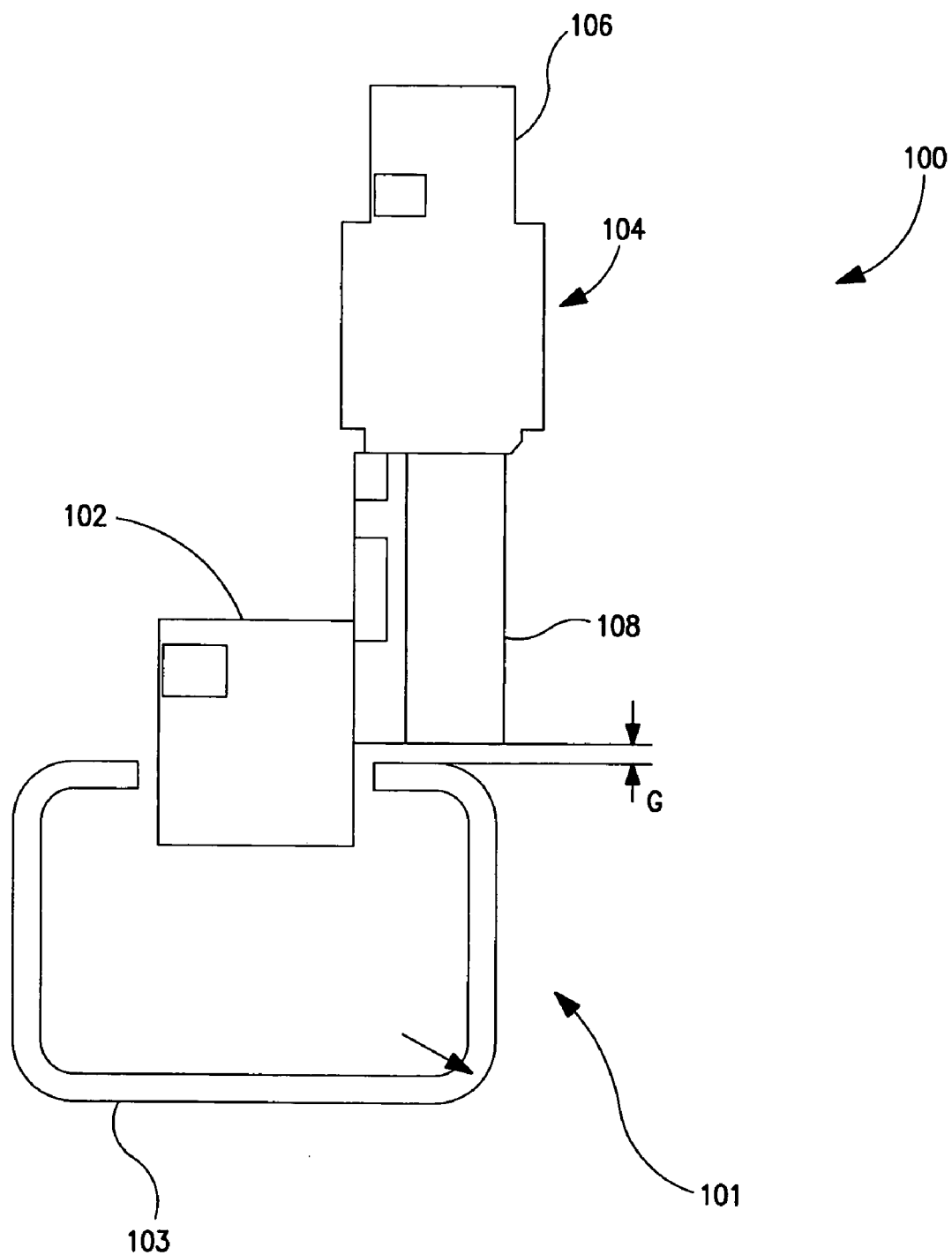
FIG. 1: is a sectional view of an exemplary sensor consistent with the invention mounted to an automobile seat rail system.

Turning to FIG. 1, there is illustrated a sectional view of one exemplary embodiment of a sensor system 100 consistent with the invention. The illustrated system generally includes an automobile seat rail system 101, including a moving upper rail 102 and a stationary lower rail 103, and a sensor assembly 104. The sensor assembly generally includes a mating connector 106 and a sensor portion 108. As shown in detail in FIG. 4, the sensor portion may include a Hall Effect integrated circuit 110 positioned on a PCB 112 and a magnet 114 disposed adjacent the Hall Effect I.C. The sensor assembly may be mounted by a variety of means, e.g. by appropriate fasteners 116 (FIG. 6), to the upper rail for movement therewith, as shown for example in FIGS. 1-3. An air gap G is established between the sensor assembly and the rail to which it is not mounted, e.g. the stationary lower rail in the illustrated embodiment. In one embodiment, the air gap G may be between about 0.5 mm to 2.75 mm. It is to be understood that, although the sensor in the illustrated embodiment is shown as being mounted to the movable upper rail 102, it could alternatively be mounted to the stationary lower rail 103.

Figure 2:
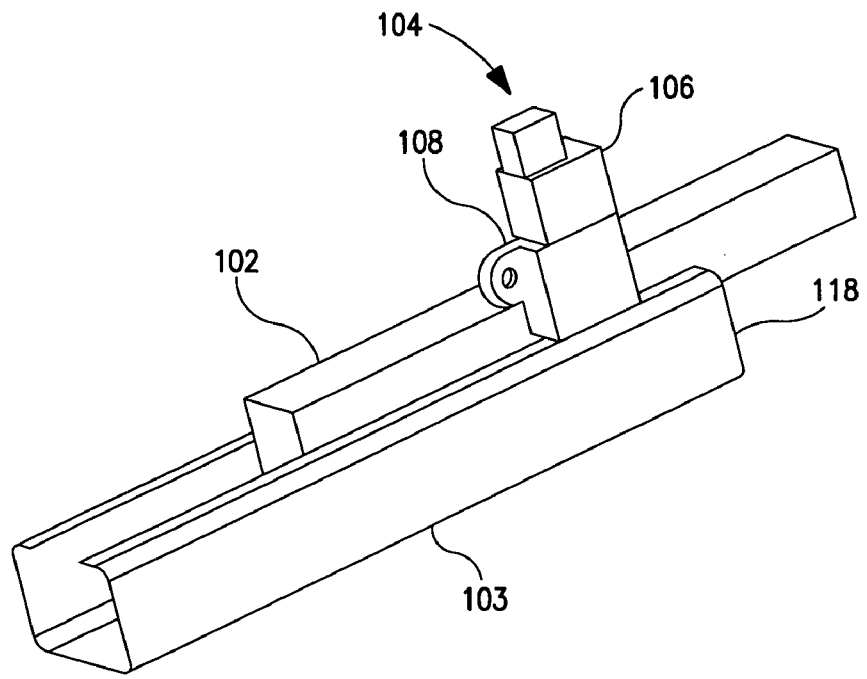
FIG. 2: is a perspective view of the sensor illustrated in FIG. 1 showing orientation of the sensor in a first position relative to the stationary rail where the sensor provides a first output.
Figure 3:
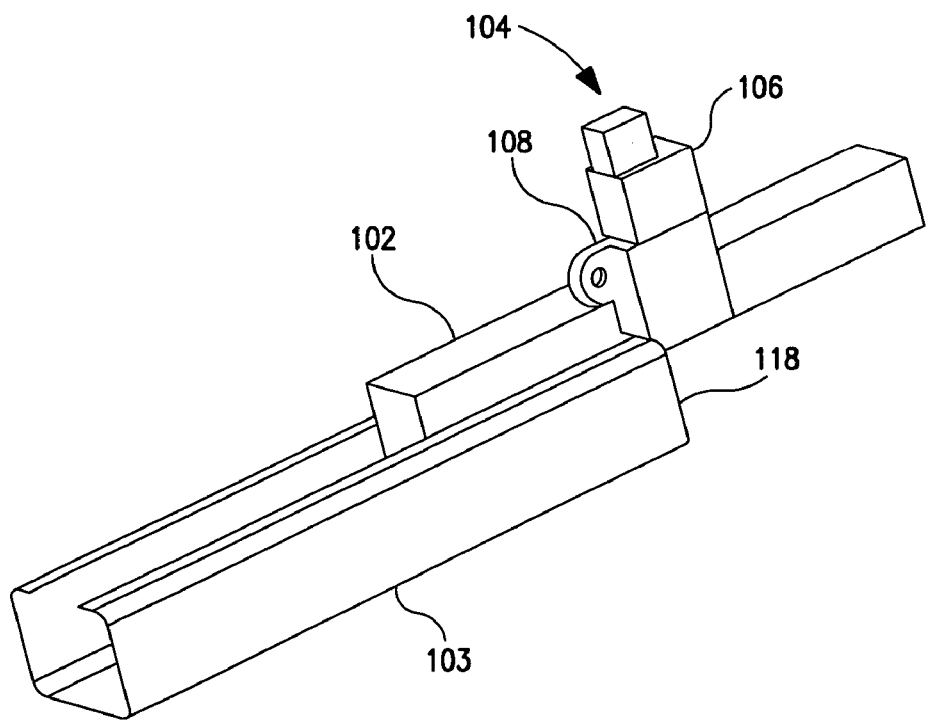
FIG. 3: is a perspective view of the sensor illustrated in FIG. 1 showing orientation of the sensor in a second position relative to the stationary rail where the sensor provides a second output.
Figures 6A, 6B:
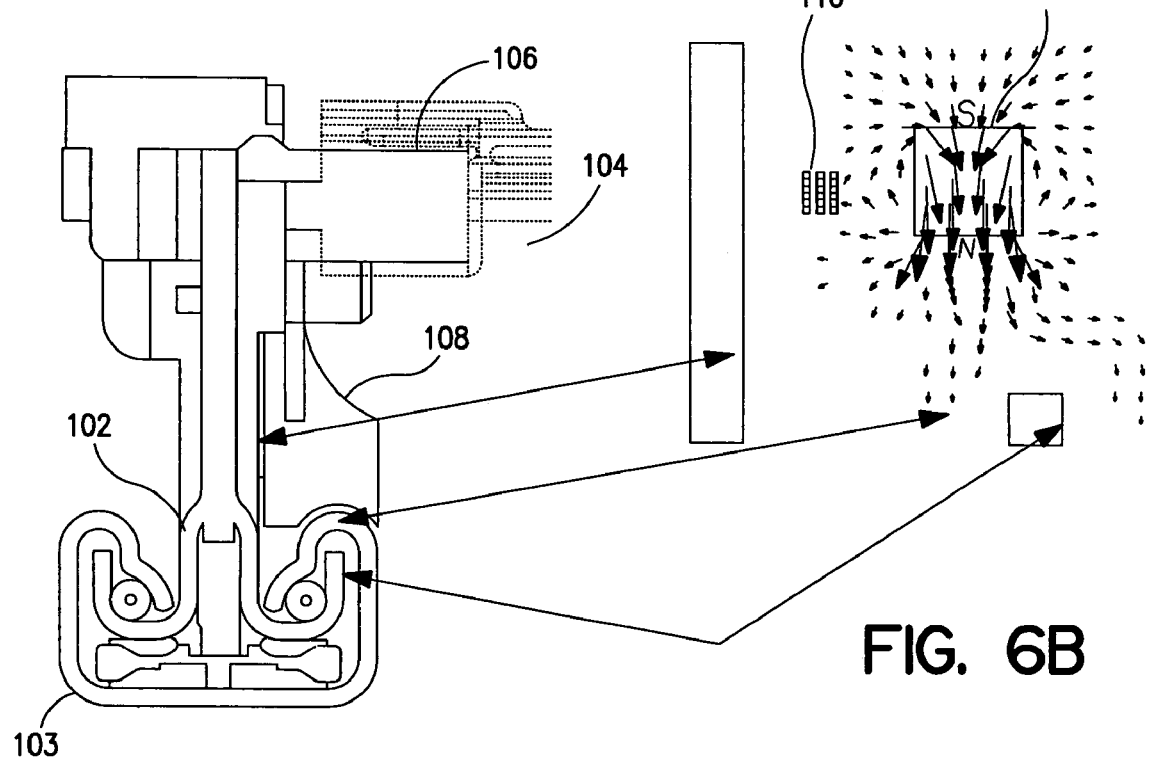
FIGS. 6A-B: is a front sectional view of an exemplary sensor consistent with the invention mounted to an automobile seat rail system and showing the magnetic circuit formed by the sensor and rail system when the sensor is in the first position shown in FIG. 2.

With reference now to FIGS. 2 and 3, and also to FIG. 6, a sensor assembly consistent with the present invention is configured to provide a first output when the movable rail 102 and stationary rail 103 are positioned to place the sensor portion 108 adjacent the stationary rail 103, and to provide a second output when the movable rail and stationary rail are positioned to place the sensor at least partially beyond the end 118 of the stationary rail. With reference to FIG. 2, for example, the movable rail is positioned relative to the stationary rail so that the sensor 108 is disposed above the stationary rail 103. In this position, the magnetic circuit for the flux associated with the sensor magnet includes both the movable and stationary rails, as shown for example in FIG. 6. It is noted that in the illustrated embodiment, the Hall device 110 is positioned relative to the North/South poles of the magnet so that the magnetic flux passes through the rails and the Hall, as shown in FIGS. 6A and 6B. The flux imparted to the Hall device 110 thus has a first level causing a first output of the Hall device.

However, when the movable rail is positioned relative to the stationary rail so that the sensor 104 is disposed at least partially beyond the end 118 of the stationary rail, the effect of the stationary rail on the magnetic flux imparted to the Hall device 110 is significantly changed. In this position, the flux imparted to the Hall device 110 has a second level causing a second output of the Hall device that is distinct from the first output. Thus, the position of the movable rail 102 relative the stationary rail 103 can be determined from the output of the Hall device 110. This output may be used to control or signal other vehicle systems, such as air bag deployment systems.

Figure 7:
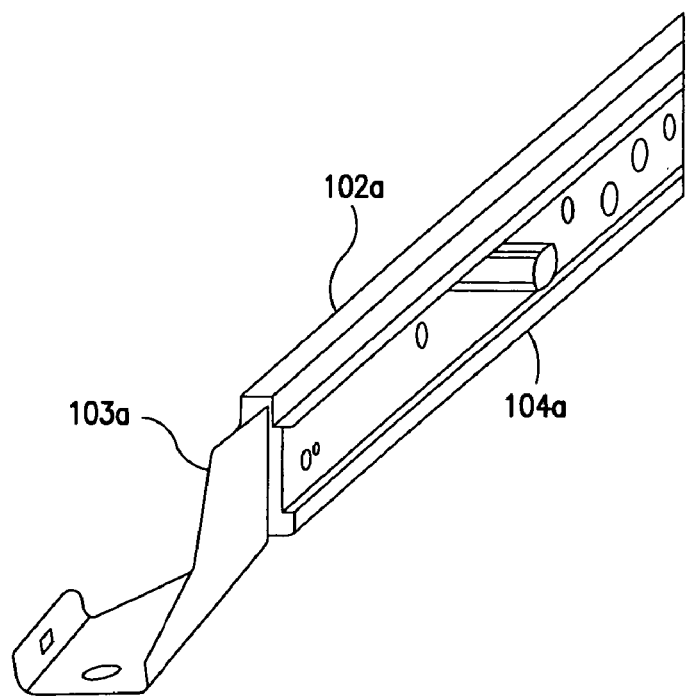
FIG. 7: is a perspective view of an alternative mounting arrangement for a sensor consistent with the invention.
Figure 8:
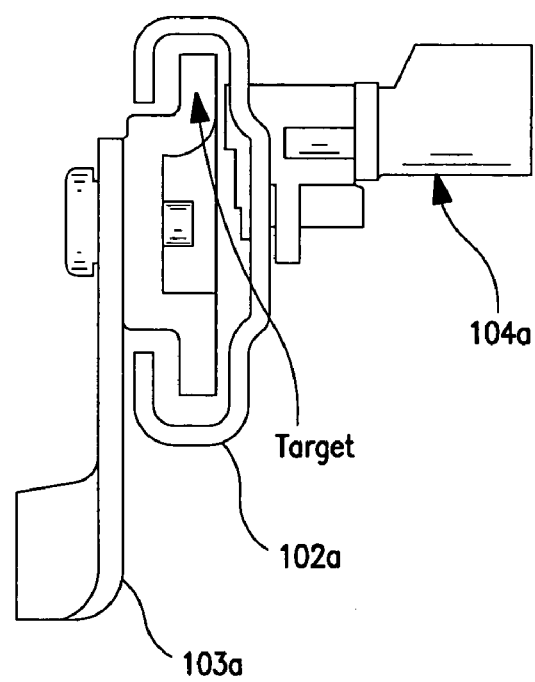
FIG. 8: is a sectional view of the sensor and mounting arrangement illustrated in FIG. 7.

A sensor consistent with the invention can be incorporated in to wide variety of vehicle rail configurations. FIGS. 7 and 8, for example, illustrate an exemplary alternative mounting arrangement for a sensor 104a consistent with the invention. In the illustrated embodiment, the sensor is mounted on the side of the movable rail 102a through an opening formed therein.

There is thus provided a sensor assembly for determining the position of an automobile seat that reliably provides an output indicative of seat position while using existing vehicle features, e.g. the stationary rail, as the sensor target. A sensor assembly consistent with the invention may include a number of advantageous features, including:

1. Highly reliable, enclosed solid state Hall device for safety application to work in difficult environmental conditions for the life of a car.

2. A low current Hall device with diagnostic capability. A two terminal Hall device will work over a wide voltage and temperature range, and provides two current output levels.

3. May utilize a programmable two wire Hall device.

4. The current outputs may nominally be 5.5 mA and 15 mA.

Figure 4:
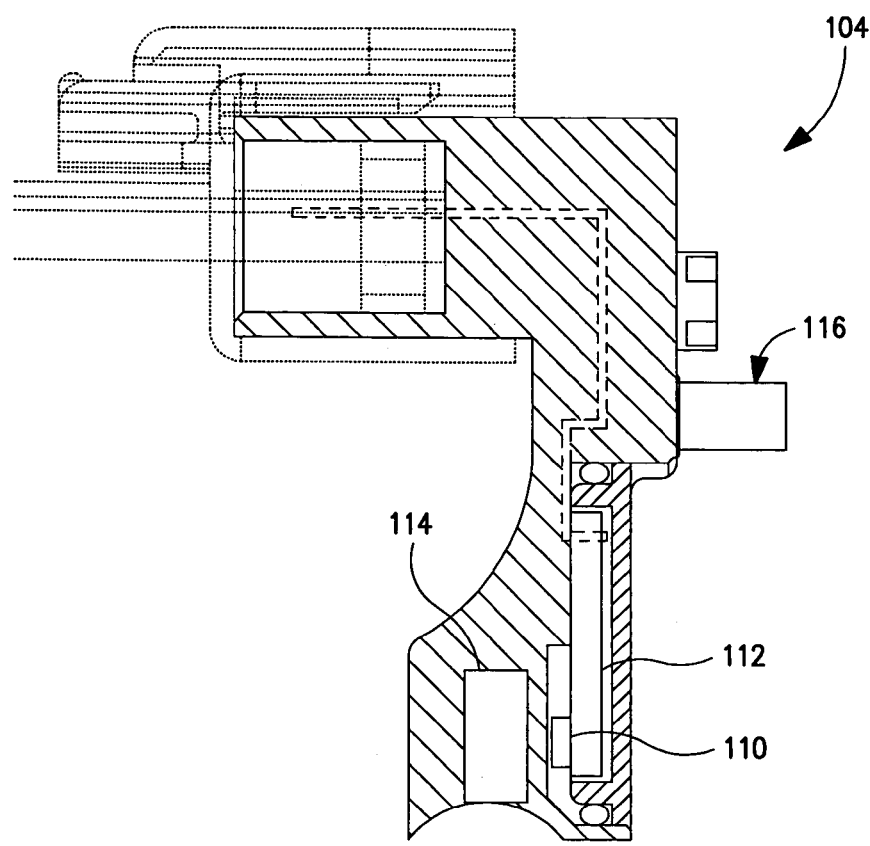
FIG. 4: is a sectional plan view of an exemplary sensor consistent with the invention.
Figure 5:
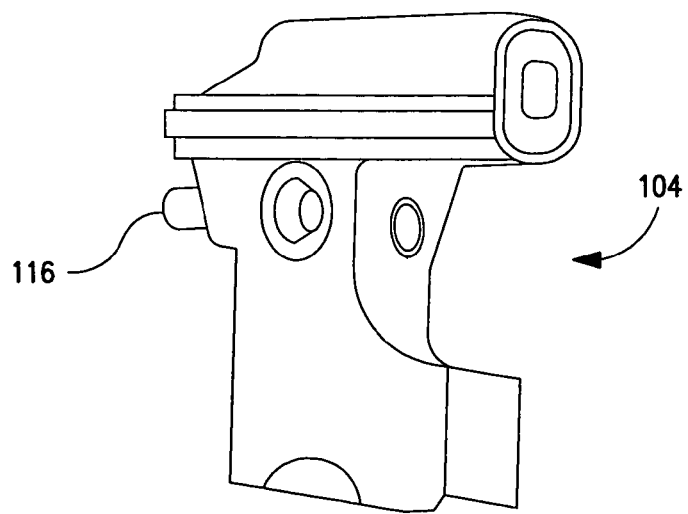
FIG. 5: is a perspective view of the sensor illustrated in FIG. 4.

5. The Hall and PCB may be in a sealed cavity in the sensor assembly housing, as shown in FIG. 4.

6. Sealing of the Hall and PCB may be achieved by a perimeter seal, grommet, o-ring, or epoxy or by ultra sonic welding or over-molding.

7. The magnet may be located outside of the sealed cavity to reduce distance to the actuating track.

8. The assembly is designed for ease of manufacture.

No need for additional brackets for the sensor or a magnet.

One sensor style can be adapted to different vehicle configurations.

Sensor may include an integral connector (can be inline or at any angle for ease of assembly).

The sensor may have a digital output (two "current states") and detect two track zones.

The sensor may be located on the moving track in a specific location. The location selection will determine the desired front zone.

The magnetic circuit of the sensor is designed to cause the Hall to change state by the presence or absence of an existing track feature (an actuation plate, such as a separate shunt mounted to the track, may also be used as a target).

The sensor may be mounted directly to the track, with or without a bracket. It has been designed for ease of mounting (typically with only one fastener).

Figure 9:
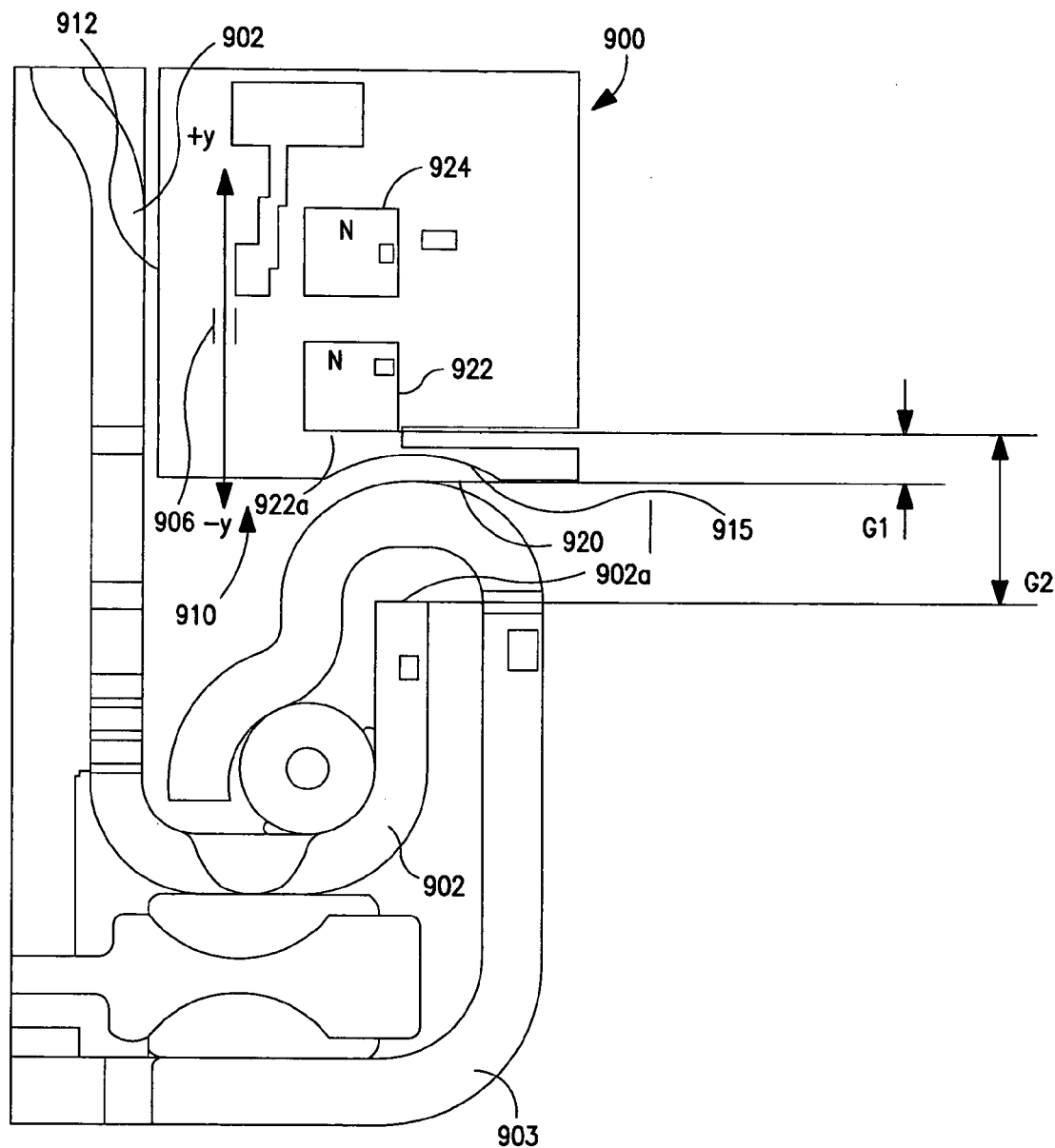
FIG. 9 is a cross sectional view of another sensor assembly embodiment having at least two magnets.

Turning to FIG. 9, a cross sectional view of another embodiment of a sensor 900 consistent with the invention is illustrated. In general, the sensor 900 includes two magnets 922, 924 enabling added tolerance in the vertical positioning of the Hall sensor 906 as further detailed herein. The sensor 900 is further described herein with reference to an automobile seat positioning sensing system. However, it should be recognized that a sensor 900 consistent with the invention may be used in a variety of other sensing applications and systems known to those skilled in the art.

The exterior housing surface of the sensor 900 has a seat track assembly facing portion 910 and a mounting portion 912. The track assembly facing portion 910 may further include an arcuate surface 915 dimensioned to compliment an upper surface 920 of the stationary rail 903. The sensor 900 may be secured to the movable rail 902 in a predetermined position such that the sensor is proximate to the stationary rail 903 when the seat is in a first position and not proximate or at least partially beyond the stationary rail 903 in a second position. The sensor 900 provides a first output signal when the seat is in the first position (FIG. 2) and a second output signal when the seat is in the second position (FIG. 3). The first and second output signals depend on the magnetic flux sensed by the Hall sensor 906. The Hall sensor 906 responds to that portion of the magnetic flux that is perpendicular to the Hall sensor 906.

Figure 10A:
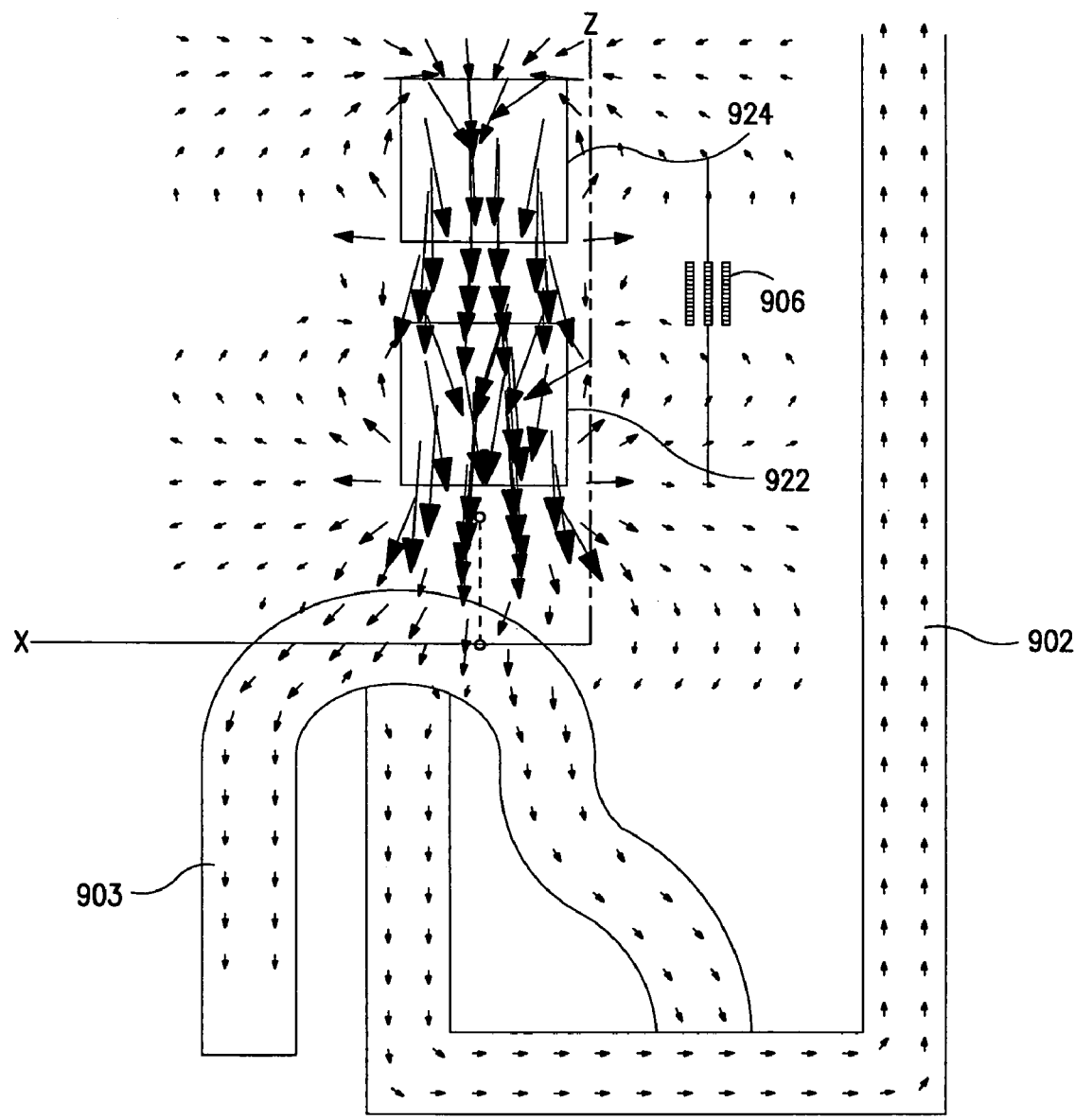
FIG. 10A is an exemplary plot of magnetic flux lines from the magnets of a sensor assembly of FIG. 9 when the sensor is proximate to the stationary rail.
Figure 10B:
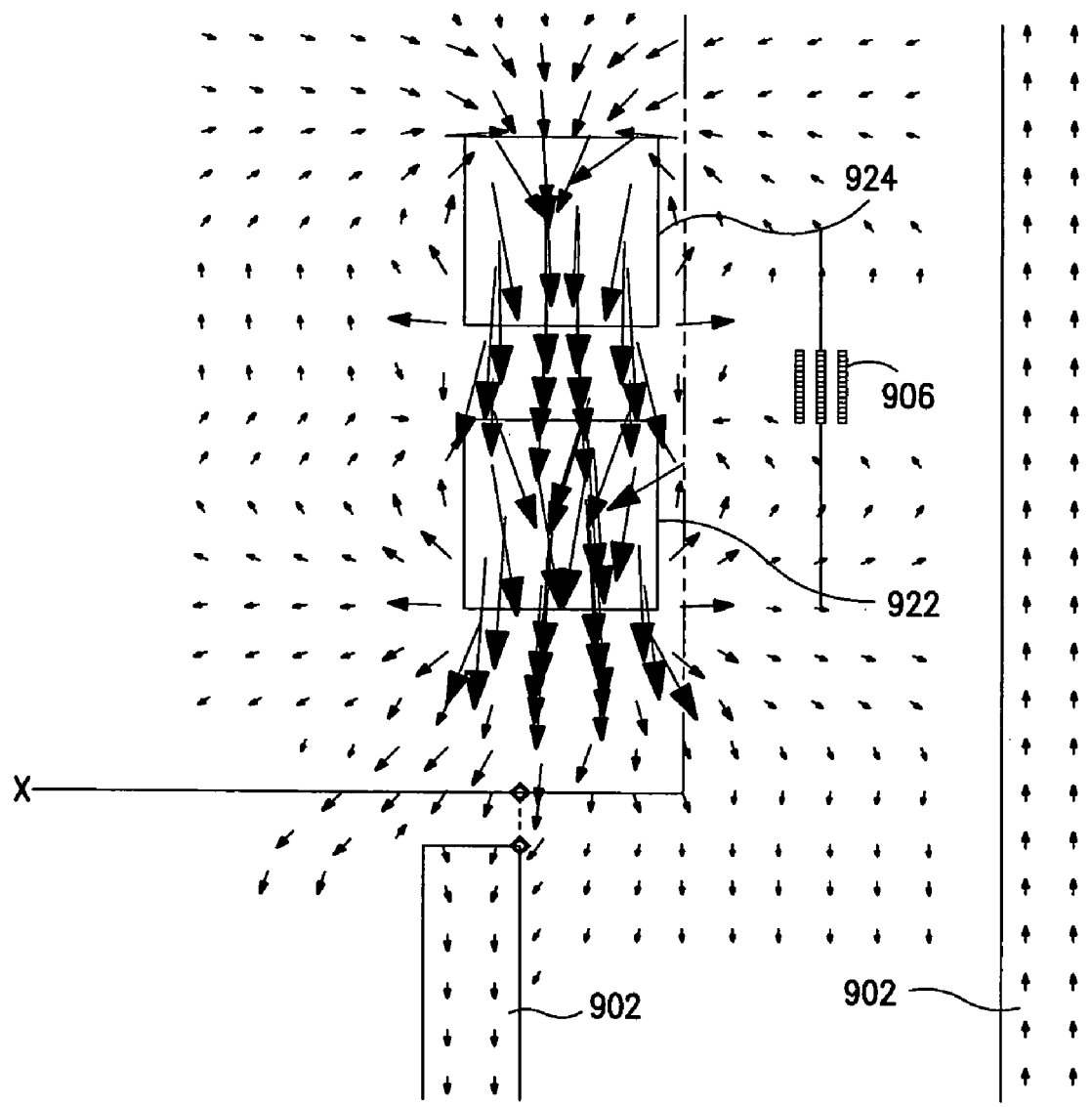
FIG. 10B is an exemplary plot of magnetic flux lines from the magnets of a sensor of FIG. 9 when the sensor assembly is not proximate to the stationary rail.

Turning to FIGS. 10A and 10B, exemplary magnetic flux lines from the magnets 922, 924 when the sensor 900 is positioned proximate to the stationary rail 903 (FIG. 10A) and when the sensor is not proximate to the stationary rail (FIG. 10B) are illustrated. In general, the stationary rail 903 becomes part of an associated magnetic circuit and causes a greater amount of magnetic flux to be perpendicular to the Hall sensor 906 than if the stationary rail is not proximate to the stationary rail. Accordingly, the Hall sensor 906 reads a greater amount of flux when the stationary rail is proximate to the sensor (FIG. 10A) than when the stationary rail is not proximate to the sensor (FIG. 10B). For example, the Hall sensor may read about 160 to 240 gauss when the stationary rail 903 is proximate the sensor 900 and only about −25 to 40 gauss when the stationary rail 903 is not proximate to the sensor 900.

Such gauss readings depend on a number of factors including the strength of the magnetic field from the magnets 922, 924, the air gap G1 (vertical distance) between the bottom portion 922a of the first magnet 922 and the upper surface portion 920 of the stationary rail 903 (the "air gap"), and the air gap G2 (vertical distance) between the bottom portion 922a of the first magnet 922 and an upper surface 902a of the J-shaped movable rail 902 as illustrated in FIG. 9. In an exemplary embodiment as shown in FIG. 9, the air gap G1 may be between about 5 mm and 2.75 mm, and the air gap G2 may be a minimum about 5 mm. Of course, those skilled in the art will recognize that the specific dimensions of the air gaps G1 and G1 depend on the position and types of magnets and hall sensor, as well as the specific geometry of the rail.

Figure 11:
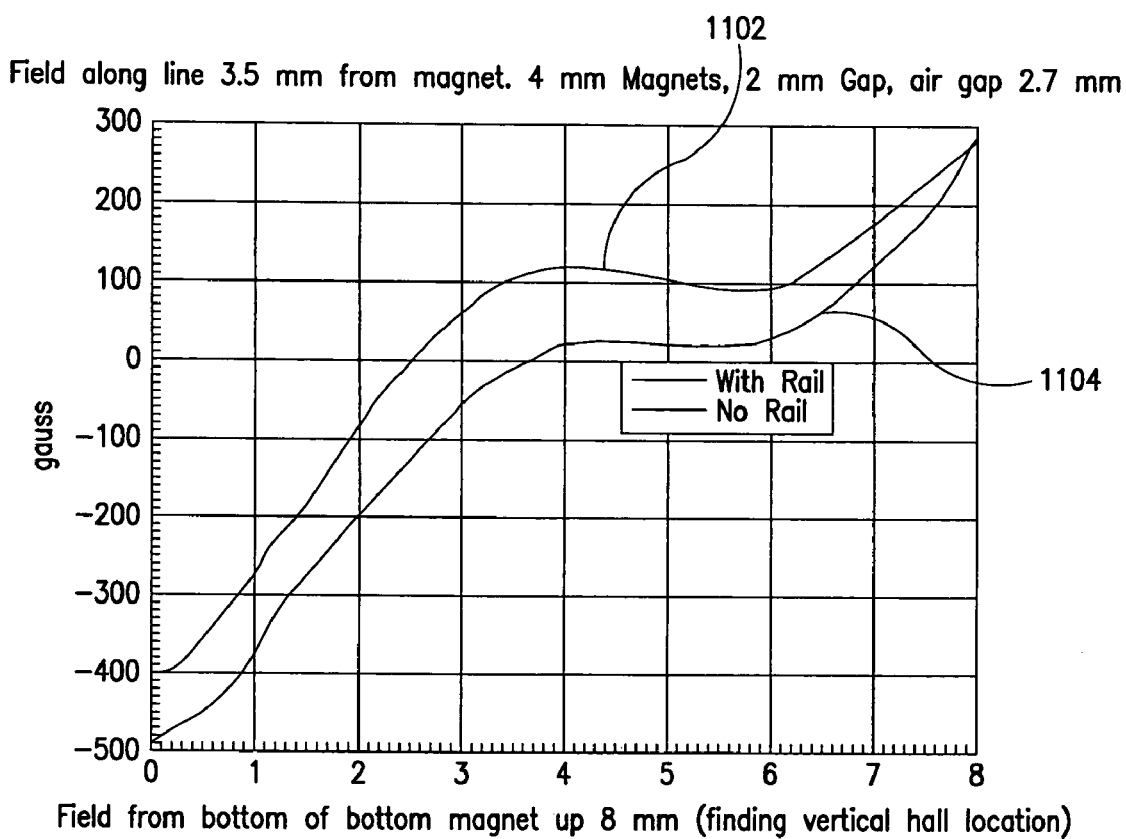
FIG. 11 is a plot of the vertical position of the Hall sensor of FIG. 9 versus the output reading of the Hall sensor illustrating the tolerance in the vertical positioning of the Hall sensor for the sensor embodiment of FIG. 9.

Turning to FIG. 11, an exemplary plot of a vertical Hall sensor 906 position versus the intensity of the magnetic filed in gauss as measured by the Hall sensor 906 in the presence (plot 1102) or the absence (plot 1104) of the stationary rail 903 is illustrated. The exemplary plots 1102, 1104 of FIG. 11 correspond to the measured magnetic field at the Hall sensor 906 when the Hall sensor 906 is located 3.5 mm from the magnets 922, 924, each magnet 922, 924 is 4 mm long in the y-direction, there is a 2 mm gap in the y-direction between each magnet 922, 924, and there is an air gap of 2.7 mm in the y-direction as measured from the bottom surface 922a of the first magnet 922 and the surface 920 of the stationary rail 903 as illustrated in FIG. 9.

As illustrated in FIG. 11, the sensor 900 advantageously provides for tolerance in the vertical positioning of the Hall sensor 906 relative to the magnets 922, 924. For instance, if the vertical Hall sensor location is located 2 mm in the +y direction from the bottom surface 922a of the first magnet 922, the Hall sensor reads about −205 gauss in the absence of the rail (plot 1104) and about −90 gauss in the presence of the rail (plot 1102) resulting in a difference of 115 gauss between the two conditions. Similarly, a difference of about 90 gauss or more also results if the Hall sensor is located anywhere between 2 mm and 5 mm in the positive y-direction from the bottom surface 922a of the first magnet 922. As such, tolerance in the vertical positioning of the Hall sensor 906 is achievable without adversely affecting sensor performance. In addition, this tolerance enables the sensor to be installed in a variety of automobile seat sensor systems where the air gap (distance from the bottom surface 922a of the first magnet 922 to the top surface 920 of the stationary rail 903) and the "Gap to 'J'" (distance from the bottom surface 922a of the first magnet 922 to the surface 902a) may vary with each installation.

In yet a further embodiment consistent with the invention, a sensor assembly consistent with the invention may include a two piece housing to protect the magnets, PCB, Hall sensor, and other internal components while providing an easy and reliable way to install the sensor assembly in a seat positioning system.

Figure 12B:
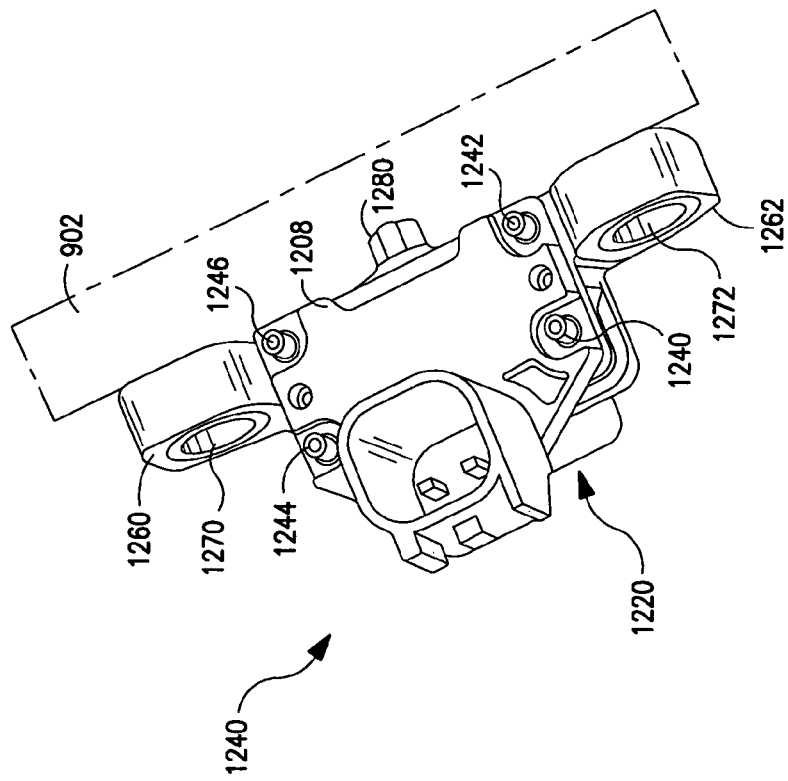
FIG. 12B is a top perspective view of the sensor assembly of FIG. 12A with the first housing coupled to the second housing.
Figure 12A:
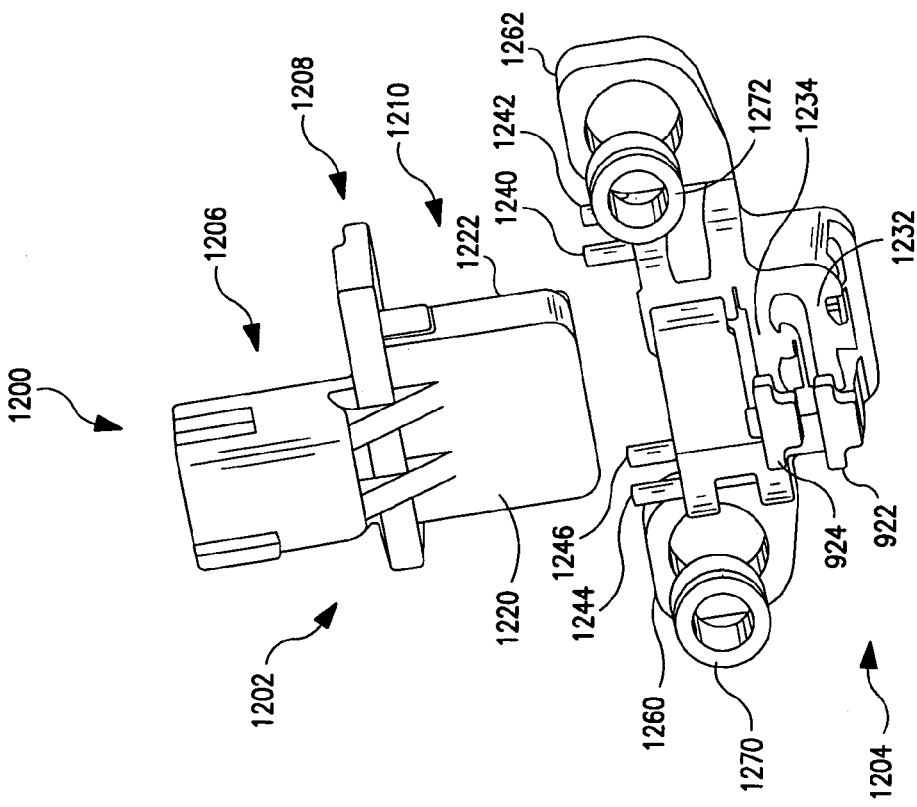
FIG. 12A is an exploded perspective view of a sensor assembly having a first housing with a back cover to protect magnets installed in a second housing.

Turning to FIG. 12A, an exploded perspective view of such a two piece sensor assembly 1200 is illustrated. The sensor assembly 1200 includes a first housing 1202 and a second housing 1204. The first housing 1202 generally includes a mating connector portion 1206, a base portion 1208, and a sensor portion 1210. The mating connector portion 1206 may contain any variety of plug or receptacle configurations to match a variety of mating connectors. The base portion 1208 may include a plurality of openings to accept an associated plurality of posts 1240, 1242, 1244, 1246 from the second housing 1204 as illustrated in FIG. 12B. The sensor portion 1210 of the first housing 1202 may include a back plate 1220. The back plate 1220 advantageously provides a cover for the magnets 922, 924 when the first housing 1202 is secured to the second housing 1204 as illustrated in FIG. 12B. The sensor portion 1210 of the first housing 1202 may also include a sensing housing 1222 configured to house a PCB, Hall sensor, and associated other components.

The second housing 1204 of the sensor assembly 1200 may be equipped with various mounting mechanisms to mount the second housing 1204 to the movable rail 902. For instance, the second housing 1204 may have lateral portions 1260, 1262 that define openings that accept associated inserts 1270, 1272 for torque mounting. The second housing 1204 may also include a protrusion 1280 and other features to mate with the movable rail 902. The second housing 1204 may also have associated openings 1232, 1234 sized to accept an associated magnet 922, 924. The magnets 922, 924 may be surrounded by a protective housing, e.g., plastic housing. The protective housing may also be shaped to snap into the associated slots 1232, 1234 in the second housing 1204.

The first housing 1202 is configured to slide over the second housing 1204 and may be secured to the second housing by any variety of means. For example, the second housing 1204 may have a plurality of prongs 1240, 1242, 1244, 1246, e.g., a heat stake or weld, that may be sized to fit in an associated opening of the base portion 1208 of the first housing 1202 as seen in FIG. 12B.

Figure 13B:
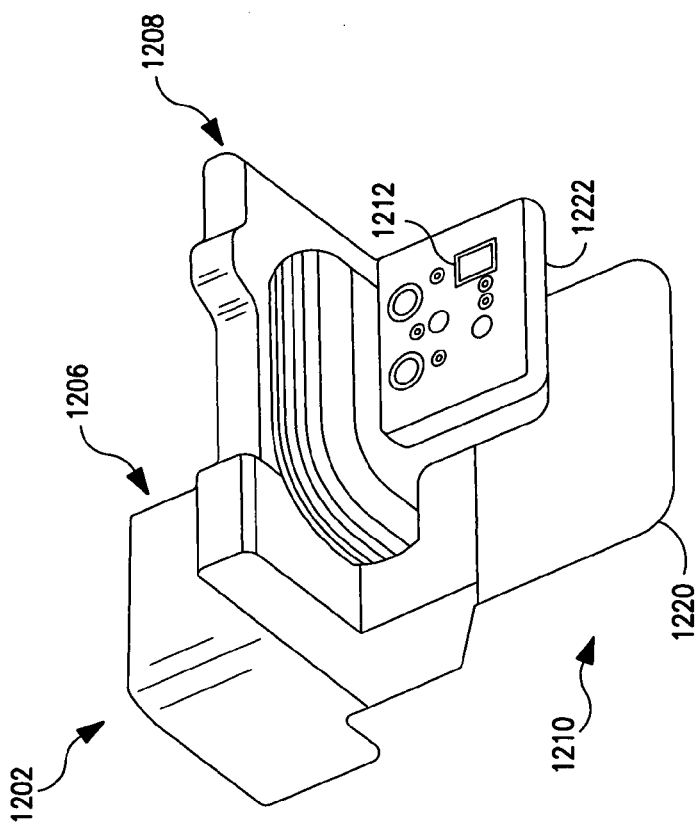
FIG. 13B is a perspective view of the exemplary first housing of FIG. 13A with the PCB inserted into the associated opening in the sensor portion of the first housing;.
Figure 13A:
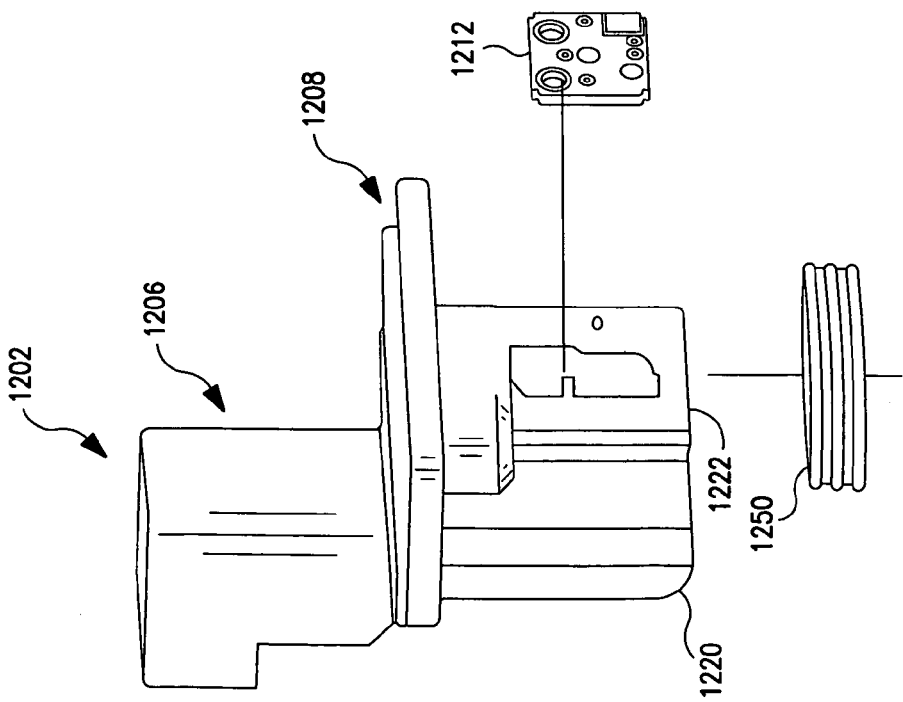
FIG. 13A is a side perspective view of an exemplary first housing having an opening in the sensor portion of the first housing to accept a PCB.

Turning to FIGS. 13A and 13B, another perspective view of the first housing 1202 is illustrated showing in greater detail how a PCB 1206 may be inserted into the sensing housing 1222 portion of the sensor portion 1210. A seal 1250 may also be sized to fit over the sensing housing 1222.

Figure 14:
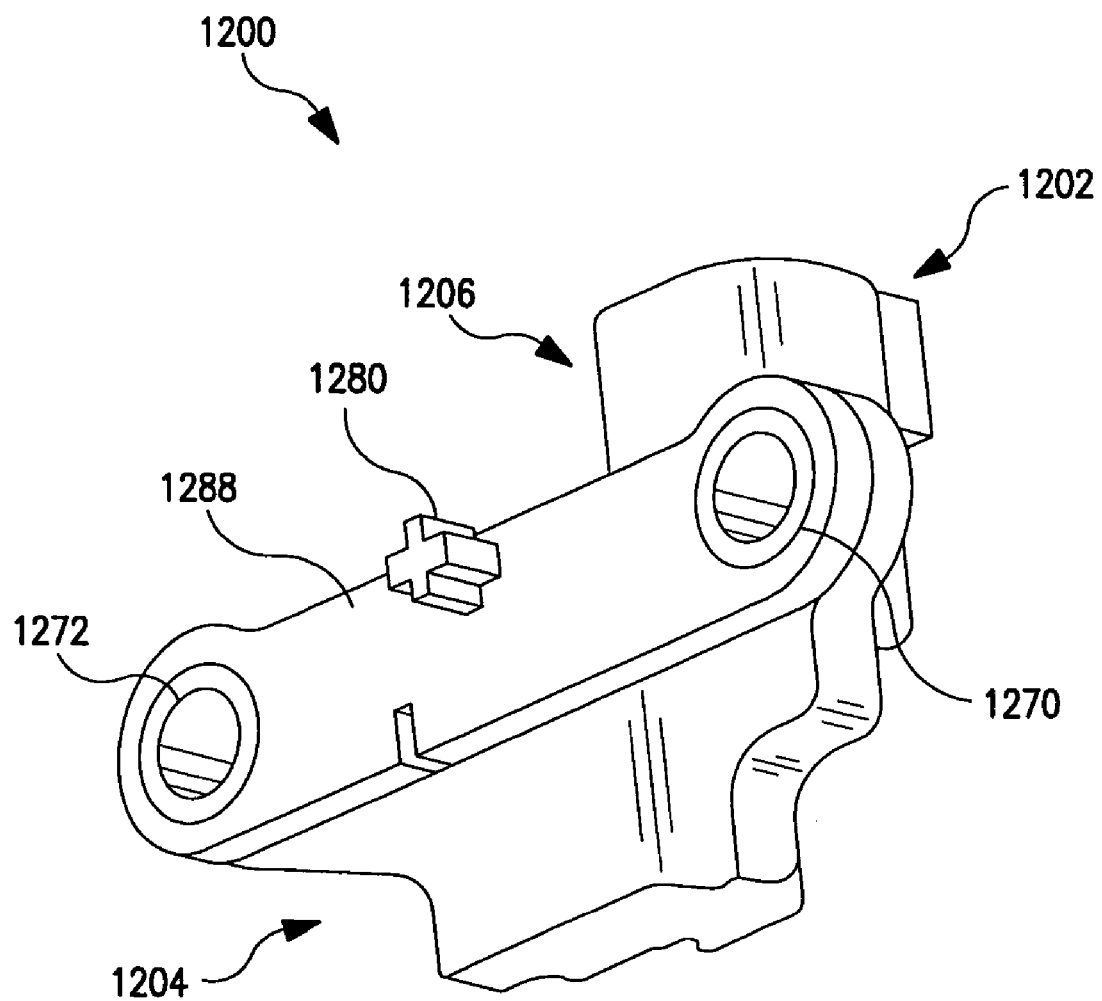
FIG. 14 is a perspective view of a sensor assembly detailing exemplary features of the second housing for securing the second housing to a desired location.

Turning to FIG. 14, a perspective view of a sensor assembly 1200 is illustrated showing in more detail some exemplary features of the second housing 1204 for mating the second housing 1204 to the movable rail 902. For instance, the second housing 1204 may have inserts 1270, 1272 for torque mounting. A protrusion 1280 and associated protruding rails 1288 may also be included on the second housing 1204 for mounting purposes. The protrusion 1280 may have any variety of shapes. Those skilled in the art will recognize any variety of other mounting means for securing the second housing 1204 to the movable rail 903.

Figure 15B:
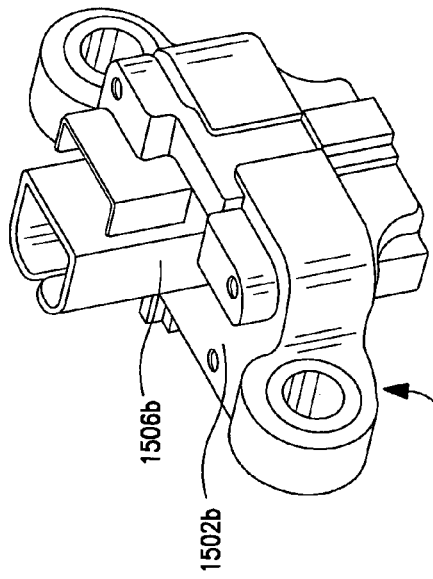
FIG. 15B is a perspective view of another sensor assembly illustrating another particular mating connector portion of the first housing.
Figure 15D:
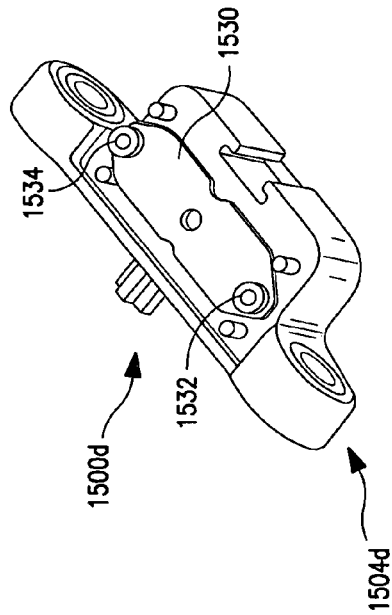
FIG. 15D is a perspective view of another sensor assembly with a pigtail provision.
Figure 15A:
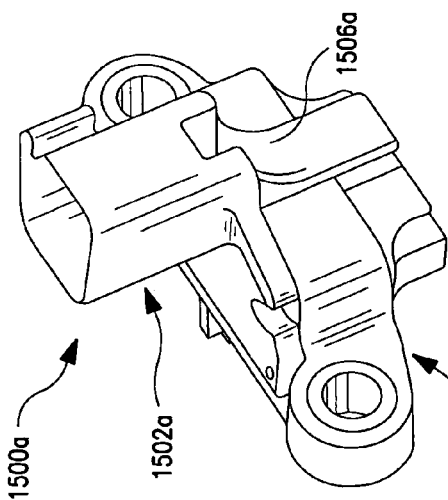
FIG. 15A is a perspective view of a sensor assembly illustrating a particular mating connector portion of the first housing.
Figure 15C:
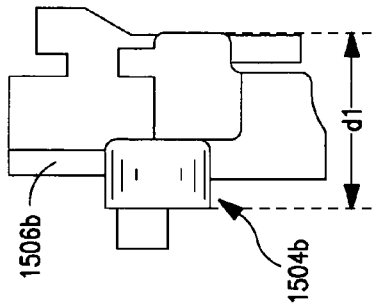
FIG. 15C is a side view of the sensor assembly of FIG. 15B illustrating the slim profile of the sensor assembly.

Turning to FIGS. 15A to 15D, various sensor assemblies are illustrated. FIG. 15A illustrates a sensor assembly 1500a with a first housing 1502a and second housing 1504a mated together. The mating connector portion 1506a of the first housing 1502a may be of the indicated configuration to match a mating connector. FIG. 15B illustrates another sensor assembly 1500b having a first housing 1502b with a different mating connector portion 1506b configured to match an associated mating connector. FIG. 15C illustrates a side view of the sensor assembly 1500b of FIG. 15B. Advantageously, the depth of the sensor assembly 1500b as indicated by measurement d1 is relatively narrow to allow greater flexibility when mounting the sensor assembly 1500b in tight areas where space is a premium. Finally, turning to FIG. 15D, another sensor assembly 1500d is illustrated. A cover 1530 is mounted to the second housing 1504d with a pair of fasteners 1532, 1534 to provide a pigtail type connecting provision.

Figure 16B:
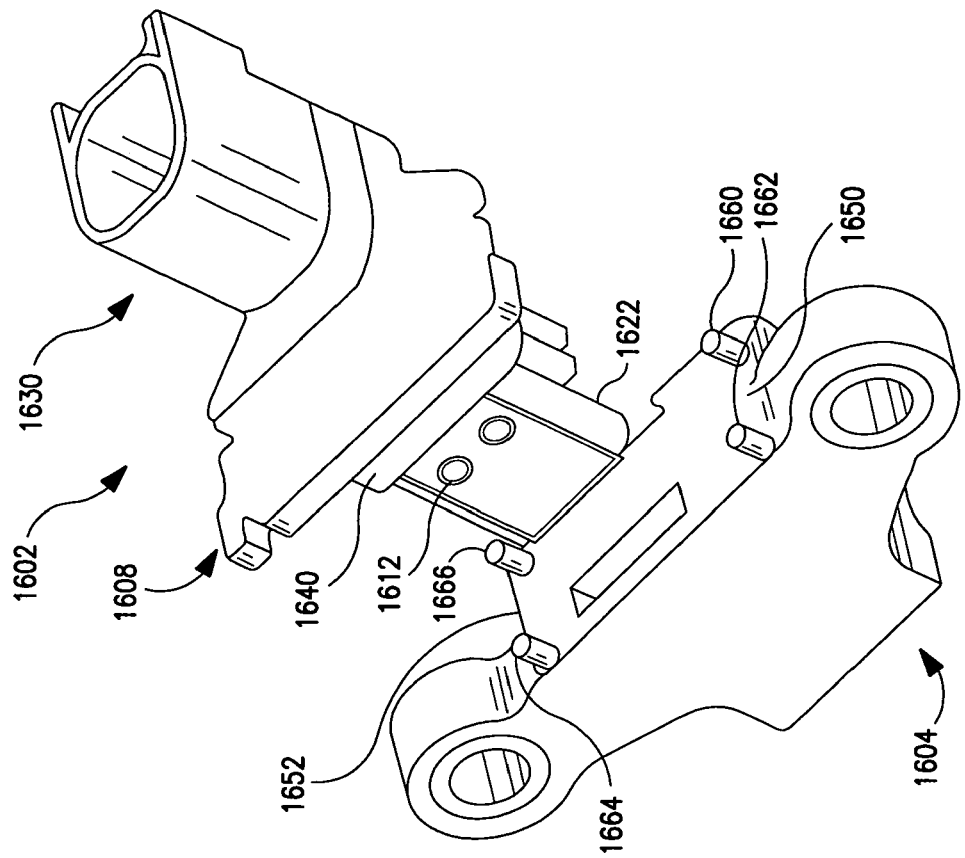
FIG. 16B is an exploded perspective view of the second housing of FIG. 16A illustrating various means for coupling the second housing to a first housing.
Figure 16A:
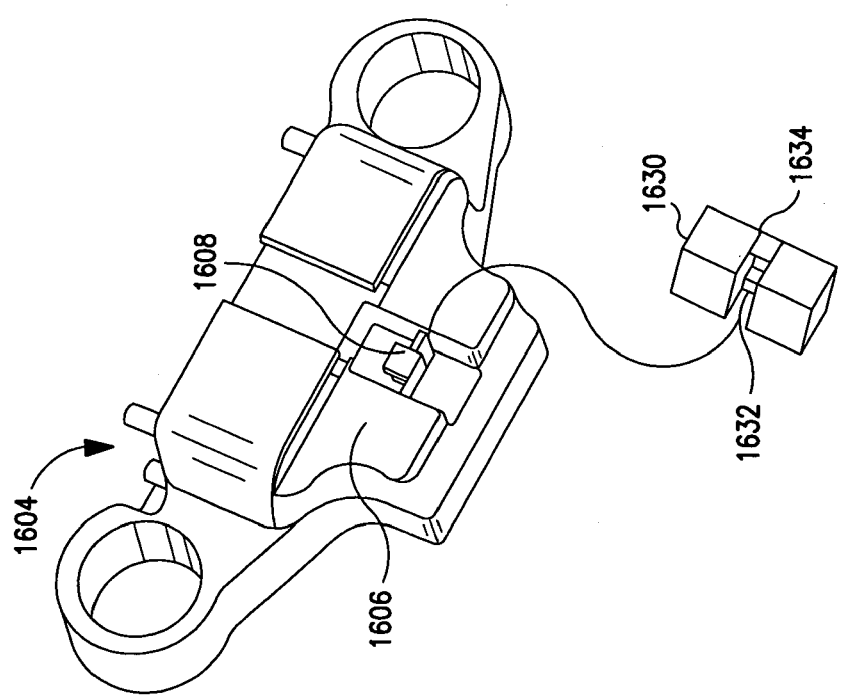
FIG. 16A is a perspective view of a second housing of a sensor assembly illustrating an opening in the second housing for accepting an integral magnetic housing having two magnets.
Figure 17C:
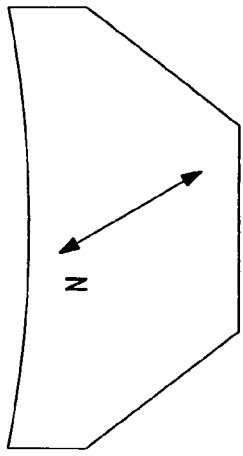
FIGS. 17A-F are various perspective views of single magnets enclosed in magnetic housings.
Figure 17F:
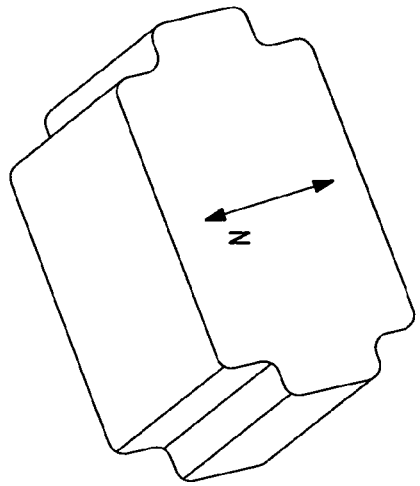
Figure 17B:
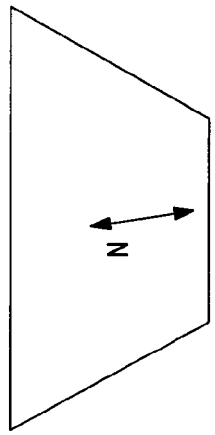
Figure 17E:
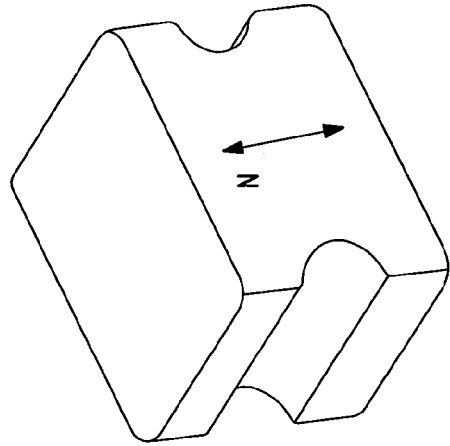
Figure 17A:
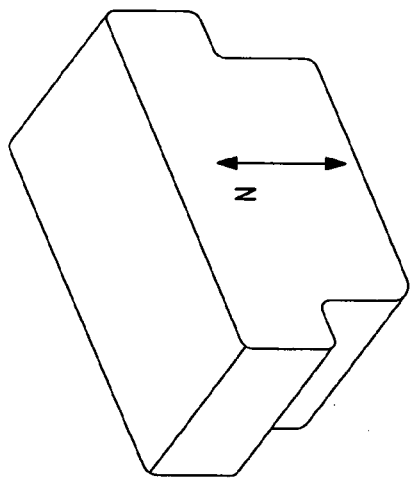
Figure 17D:
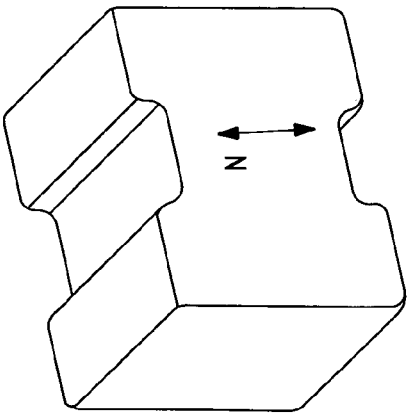

Turning to FIG. 16A, an exemplary second housing 1604 having an opening 1606 with a protrusion 1608 is illustrated. The opening 1606 may be so dimensioned to accept an enclosed magnetic housing 1630 having two magnets therein. The magnetic housing 1630 may also have a pair of rails 1634, 1636 that are configured to cooperate with the protrusion 1608 such that the magnetic housing 1630 may be readily snapped into the opening 1606 of the second housing 1604.

FIG. 16B is an exploded view illustrating the mounting portion side of the second housing 1604 of FIG. 16A and an associated first housing 1602 that may be coupled to the second housing. The second housing 1604 may be equipped with various mounting arrangement to secure the first housing 1602 to the second housing 1604. Such mounting arrangements may include openings 1650, 1652 to accept screws for attaching the base portion 1608 of the first housing 1602. Protrusions 1660, 1662, 1664, 1666, e.g., heat stakes or welds, may also be provided to accept associated openings in the base portion 1608 of the first housing 1602. A perimeter seal 1640 configured to fit over the sensing housing 1622 may also be utilized. The PCB 1612 may be soldered to an outside side of the sensing housing 1622 as illustrated in FIG. 16B.

Turning to FIGS. 17A to 17F, various housing embodiments for a magnet are illustrated. The housing embodiments may have a variety of shapes and sizes to fit into various associated openings of the second housing of a sensor assembly consistent with the invention. The housing may also be of a variety of materials, e.g., plastic, which would not adversely affect the magnetic field from the magnet. Each magnetic housing, e.g., the embodiments illustrated in FIGS. 17A to 17F, may be further attached together to form one integrated housing having both magnets. For instance, such an exemplary integrated housing 1630 is illustrated in FIG. 16A.

Figure 18A:
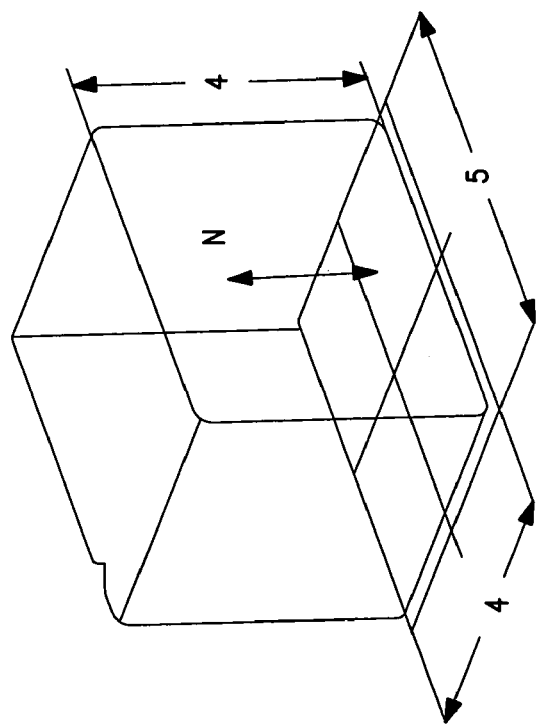
FIG. 18A is a perspective view of one magnet that may be utilized to form an integral magnetic housing.
Figure 18C:
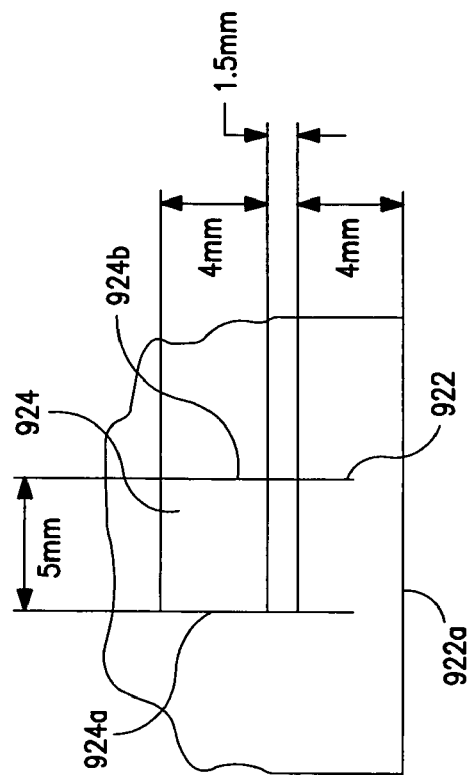
FIG. 18C is a front elevation view of a housing utilized to form an integral magnetic housing for two magnets.
Figure 18B:
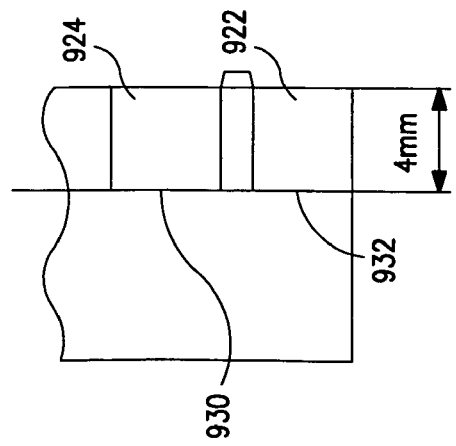
FIG. 18B is a side elevation view of a housing utilized to form an integral magnetic housing for two magnets.

To form an integral housing for both magnets, a starting point is each magnet having a general cube shape as illustrated in FIG. 18A. In forming an integral housing, each magnet should be positioned to touch the exterior surface 930, 932 of the integral housing as illustrated in FIG. 18B, but not to extend past it. As illustrated in FIG. 18C, the integral housing can have material removed on both sides 924a, 924b of the magnets 924, 922. The bottom surface 922a of the first magnet 922 should be exposed such that a cavity is open on the bottom surface.

Figure 19B:
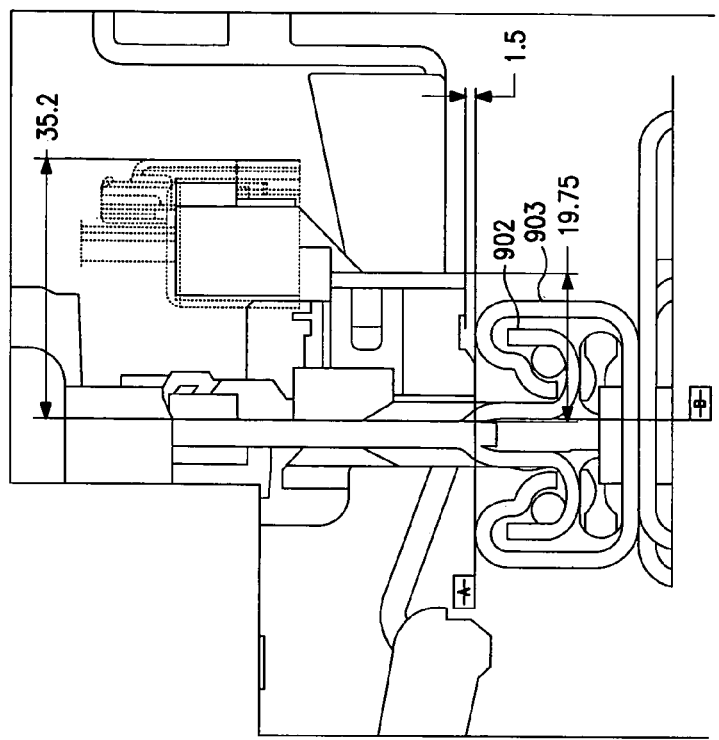
FIG. 19B is a front view of the sensor assembly of FIG. 19A.
Figure 19A:
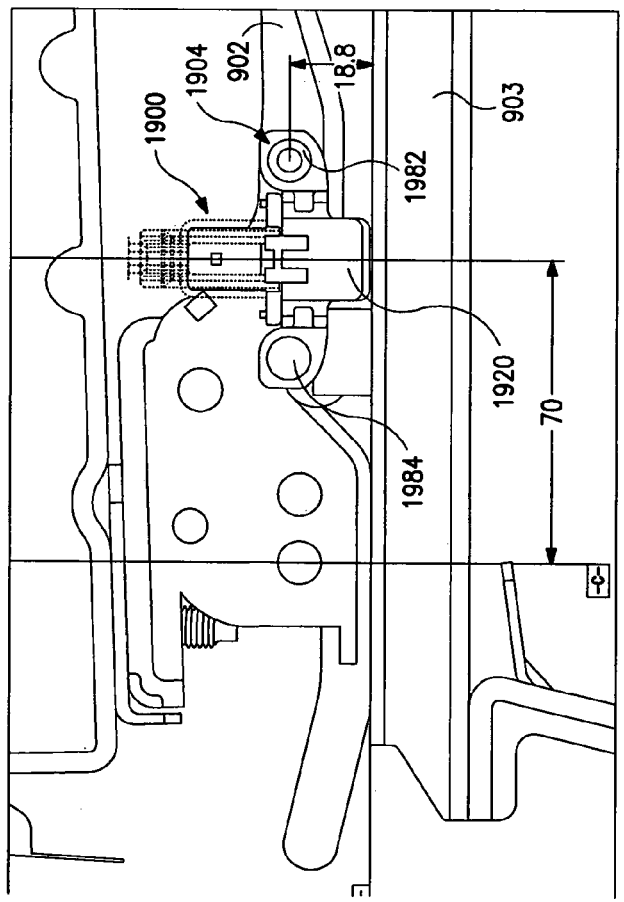
FIG. 19A is a side perspective view of a sensor assembly coupled to a movable rail of a seat track assembly.

In yet another embodiment of the present invention, openings may be pierced into the movable rail 902 after assembly of a seat track system including a stationary rail 903 and movable rail 902. Turning to FIG. 19A, a side view of a completed seat system is illustrated having a movable rail 902 and a stationary rail 903. Advantageously, the sensor assembly 1900 may be mounted to the movable rail 903 after the seat track assembly is constructed. Openings may be pierced into the movable rail 902 such that the second housing 1904 of the sensor assembly 1900 may be secured to the movable rail 902. FIG. 19B illustrates a front end view of the sensor assembly 1900 of FIG. 19A which may be attached to the movable rail 902 after assembly of the seat track system.

Figure 20:
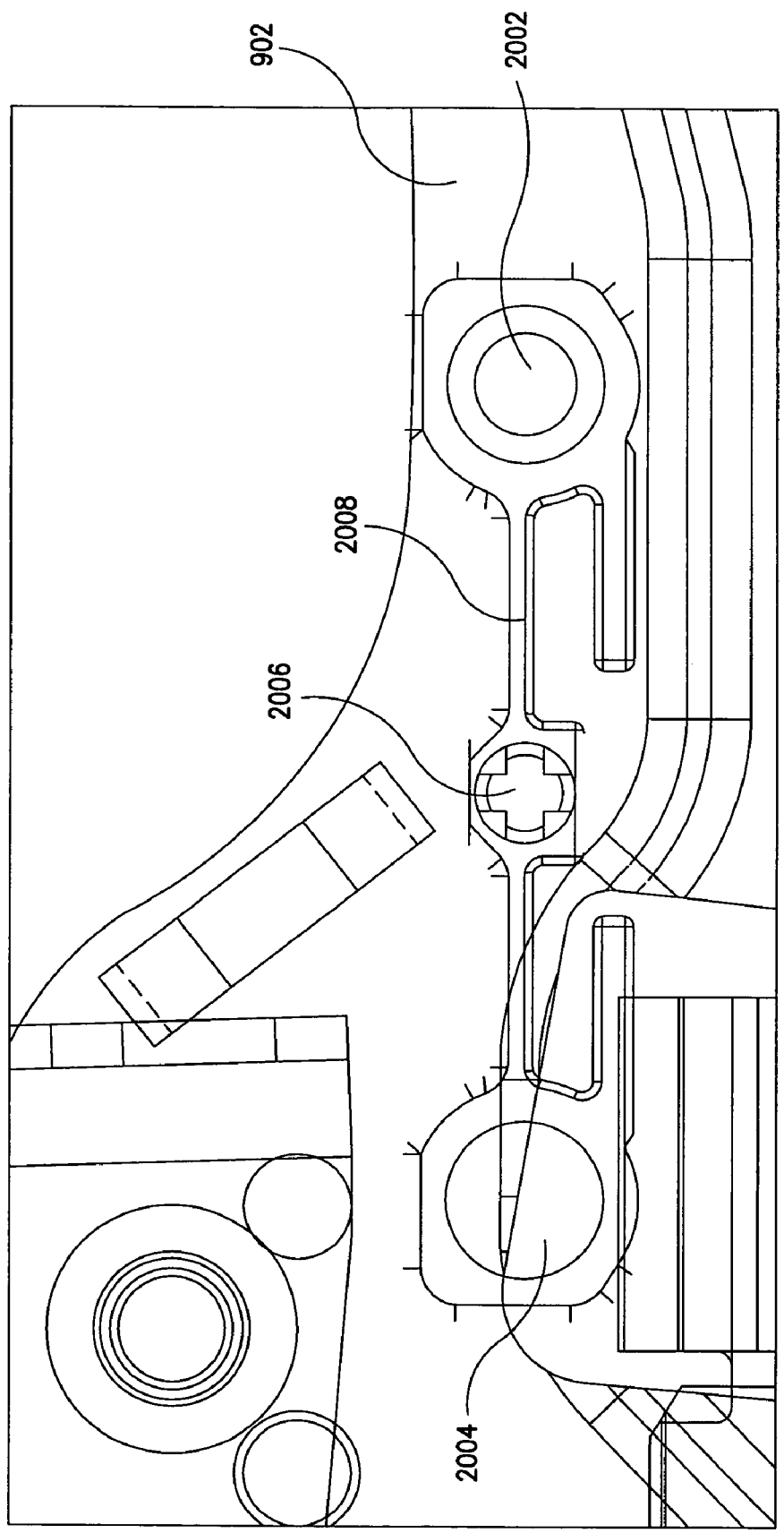
FIG. 20 is a side view of a movable rail having openings pierced into the movable rail after construction of a seat track assembly to mate with openings and projections in an associated second housing of an associated sensor assembly.

FIG. 20 illustrates exemplary openings 2002, 2004 that may be pierced into the movable rail 902 to enable mating of the second housing of a sensor assembly consistent with the invention to the movable rail 902. Another opening 2006 so dimensioned as to accept a protrusion from the second housing (e.g., see FIG. 14) may also be pierced into the movable rail. In addition, a rail slot 2008 may also be pierced to accept associated rail protrusion in the upper housing of a sensor assembly consistent with the invention.

Figure 21:
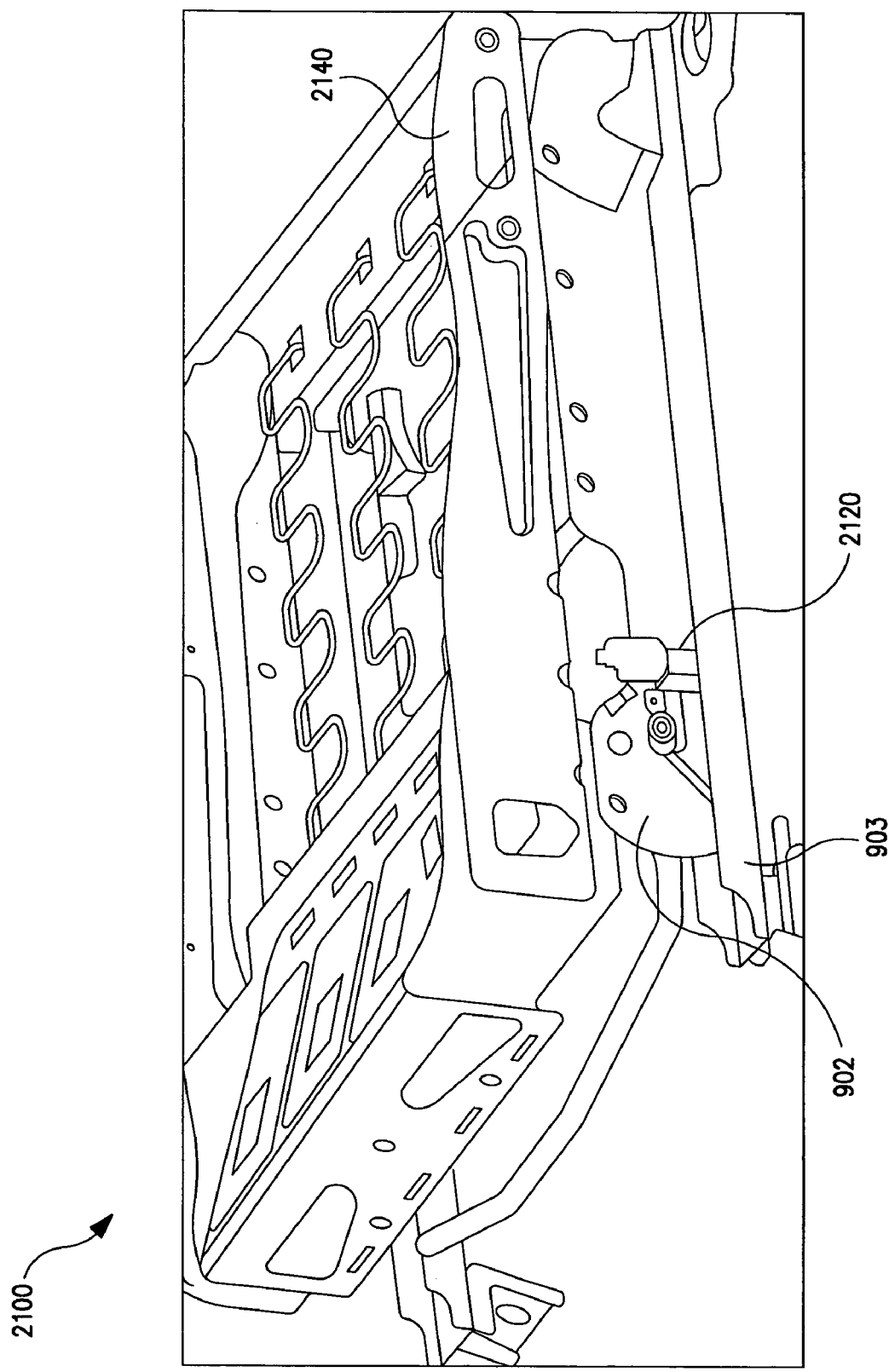
FIG. 21 is a perspective view of seat position system including a seat frame and sensor assembly consistent with the invention.

Turning to FIG. 21, a seat position system 2100 is illustrated. The system 2100 includes a seat frame 2140 to which an automobile seat is attached. The system 2100 further includes a sensor assembly 2120 mounted to a movable rail

902. The movable rail 902 moves relative to the stationary rail 903 such that a first output signal is provided by the sensor assembly 2120 when the movable rail is proximate to the stationary rail 903 as illustrated. The sensor assembly 2120 provides a second output signal when the sensor movable rail moves enough from the position shown in FIG. 21 such that the sensor assembly 2120 is not proximate or at least partially beyond the stationary rail 903.

Figure 23:
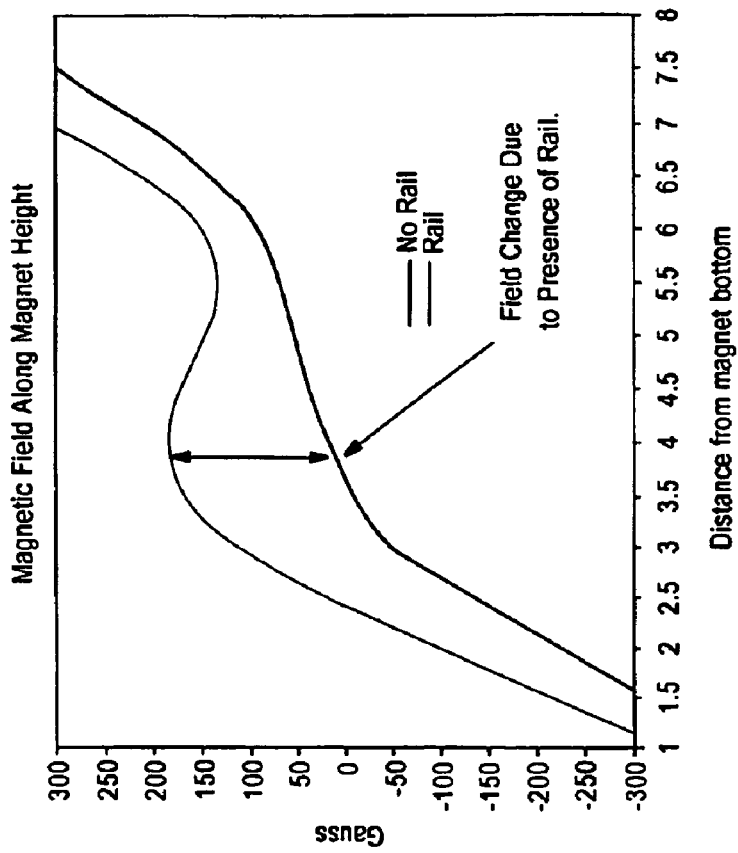
FIG. 23 is a plot of the magnetic field along the magnet height for a magnet having a C-shaped cross-section.
Figure 22:
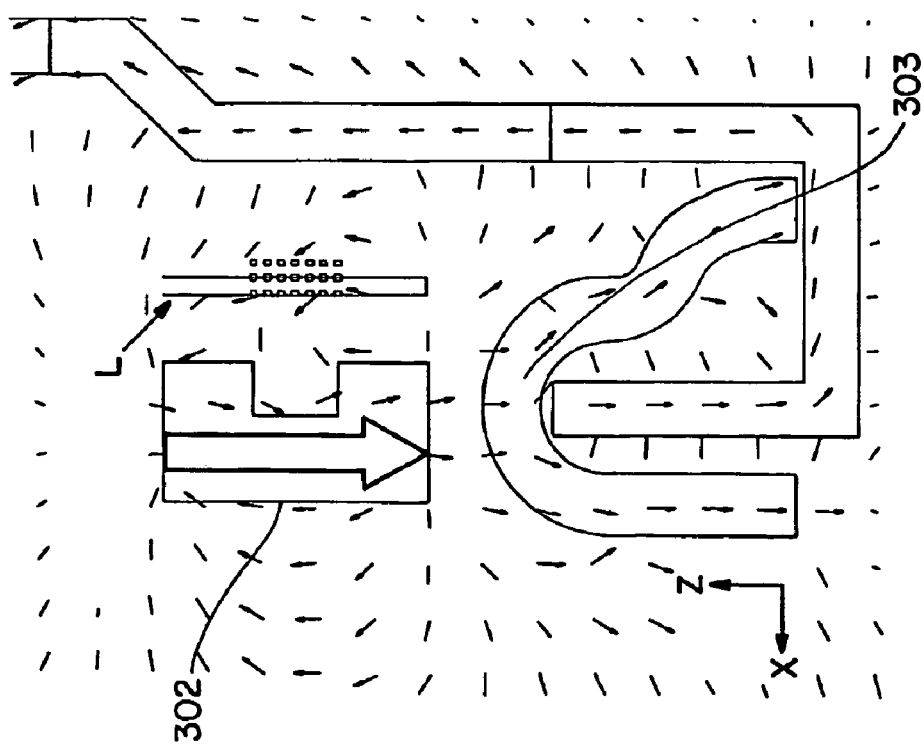
FIG. 22 is a schematic view showing the magnetic field lines associated with a magnet having a C-shaped cross-section when the sensor is proximate the rail.

Also as shown in the exemplary embodiment, the magnet may have a generally C-shaped cross-section. Referring to FIG. 22, a schematic view of the magnetic field lines associated with a magnet 302 having a C-shape cross-section when an activating rail 303 is proximate the sensor. FIG. 23 is a plot of the magnetic field along the magnet height for the magnet configuration shown in FIG. 22 where the field is measured along a line L corresponding to the location of the hall sensor. It can be seen from the plot that the difference in the magnetic field when an activating rail 303 is proximate the magnet 302 and when no rail is proximate the magnet is especially pronounced between a height of about 3 to 5 mm above the bottom of the magnet. The region of the most pronounced difference in the strength of the magnetic field may be an especially advantageous region for placing the Hall device. However, as indicated by the plot, depending upon the sensitivity of the Hall device, the Hall device may suitably placed at other heights from the bottom of the magnet as well.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention as defined in the appended claims.

What is claimed is:

1. A non-contact position sensor comprising:
   a sensor assembly comprising a housing and at least one magnet disposed in said housing, said magnet disposed adjacent a magnetic field sensor disposed in said housing, said magnetic field sensor being spaced a fixed distance from said magnet and comprising a surface in opposed facing relationship to said magnet with a north-south axis of said magnet generally parallel to said surface, said sensor assembly mounted to a rail of an automobile seat rail system; and
   an activating member, said activating member being vertically spaced from a bottom surface of said housing;
   said magnetic field sensor providing a first output corresponding to a first amount of magnetic flux imparted perpendicularly to said surface of said magnetic field sensor when said activating member is in a first position relative to said sensor assembly, and a second output corresponding to a second amount of magnetic flux imparted perpendicularly to said surface of said magnetic field sensor when said activating member is in a second position relative to said sensor assembly, said first amount of magnetic flux being greater than said second amount of magnetic flux.

2. The position sensor of claim 1, wherein said magnetic field sensor comprises a Hall sensor.

3. The position sensor of claim 1 wherein said sensor assembly is mounted directly to said rail.

4. The position sensor of claim 1 wherein said sensor assembly is mounted to said rail via a bracket.

5. The position sensor of claim 1, wherein said sensor assembly is mounted on a first rail of an automobile seat rail system and the activating member is a second rail of said automobile seat rail system.

6. A non-contact position sensor comprising:
   a sensor assembly comprising a housing and at least one magnet disposed in said housing, said magnet disposed adjacent a magnetic field sensor disposed in said housing, said magnetic field sensor being spaced a fixed distance from said magnet and comprising a surface in facing opposed relationship to said magnet with a north-south axis of said magnet generally parallel to said surface; and
   an activating member, said activating member being vertically spaced from a bottom surface of said housing and being a rail of an automobile seat rail system;
   said magnetic field sensor providing a first output corresponding to a first amount of magnetic flux imparted perpendicularly to said surface of said magnetic field sensor when said activating member is in a first position relative to said sensor assembly and a second output corresponding to a second amount of magnetic flux imparted perpendicularly to said surface of said magnetic field sensor when said activating member is in a second position relative to said sensor assembly, said first amount of magnetic flux being greater than said second amount of magnetic flux.

7. A seat position sensor system comprising:
   a seat rail system comprising a movable rail and a stationary rail;
   a sensor assembly comprising a housing and at least one magnet and a Hall device disposed in said housing, said Hall device being spaced a fixed distance from said magnet and comprising a surface in opposed facing relationship to said magnet with a north-south axis of said magnet generally parallel to said surface, said sensor assembly being mounted to one of said movable rail or said stationary rail with a bottom surface of said housing being vertically spaced from the other of said movable rail or said stationary rail; and
   said Hall device providing a first output corresponding to a first amount of magnetic flux imparted perpendicularly to said surface of said Hall device when said movable rail is in a first position relative to said stationary rail and a second output corresponding to a second amount of magnetic flux imparted perpendicularly to said surface of said Hall device when said movable rail is in a second position relative to said stationary rail, said first amount of magnetic flux being greater than said second amount of magnetic flux.

8. The system of claim 7 wherein said sensor assembly is mounted to said movable rail.

9. The seat position sensor of claim 7 wherein said sensor assembly is mounted to said stationary rail.

10. The system of claim 7 wherein said sensor assembly is mounted to one of said movable rail and said stationary rail via a mounting bracket.

11. The system of claim 7 wherein one of said movable rail and stationary rail comprises an activating member, said activating member being in a first activating position relative to said sensor assembly when said movable rail is in said first position relative to said stationary rail, and said activating member being in a second activating position relative to said sensor assembly when said movable rail is in said second position relative to said stationary rail, said activating member not extending between said at least one magnet and said Hall device in either of said first and second activating positions.

12. A method of sensing vehicle seat position comprising:

providing a sensor assembly comprising a housing and at least one magnet and a Hall device disposed in said housing, said Hall device being spaced a fixed distance from said magnet and comprising a surface in opposed facing relationship to said magnet with a north-south axis of said magnet generally parallel to said surface;

mounting said sensor assembly to a first seat rail with a bottom surface of said housing being vertically spaced from a second seat rail, said Hall device providing an output, said output being a first output corresponding to a first amount of magnetic flux imparted perpendicularly to said surface of said Hall device when said sensor assembly is in a first position relative to a second seat rail and said output being a second output corresponding to a second amount of magnetic flux imparted perpendicularly to said surface of said Hall device when said sensor assembly is in a second position relative to said second seat rail, said first amount of magnetic flux being different from said second amount of magnetic flux; and determining a position of said seat in response to said output.

13. The method of claim 12 further comprising mounting an activating member to said second seat rail, said Hall device providing a first output when said activating member is in a first position relative to said sensor assembly and a second output when said activating member is in a second position relative to said sensor assembly, said activating member not extending between said at least one magnet and said Hall device in either of said first and second position of said activating member.

* * * * *